Nov. 8, 1949     W. F. ALLER     2,487,628
GAUGING DEVICE FOR PISTON RINGS AND THE LIKE
Filed Nov. 10, 1944     2 Sheets-Sheet 1
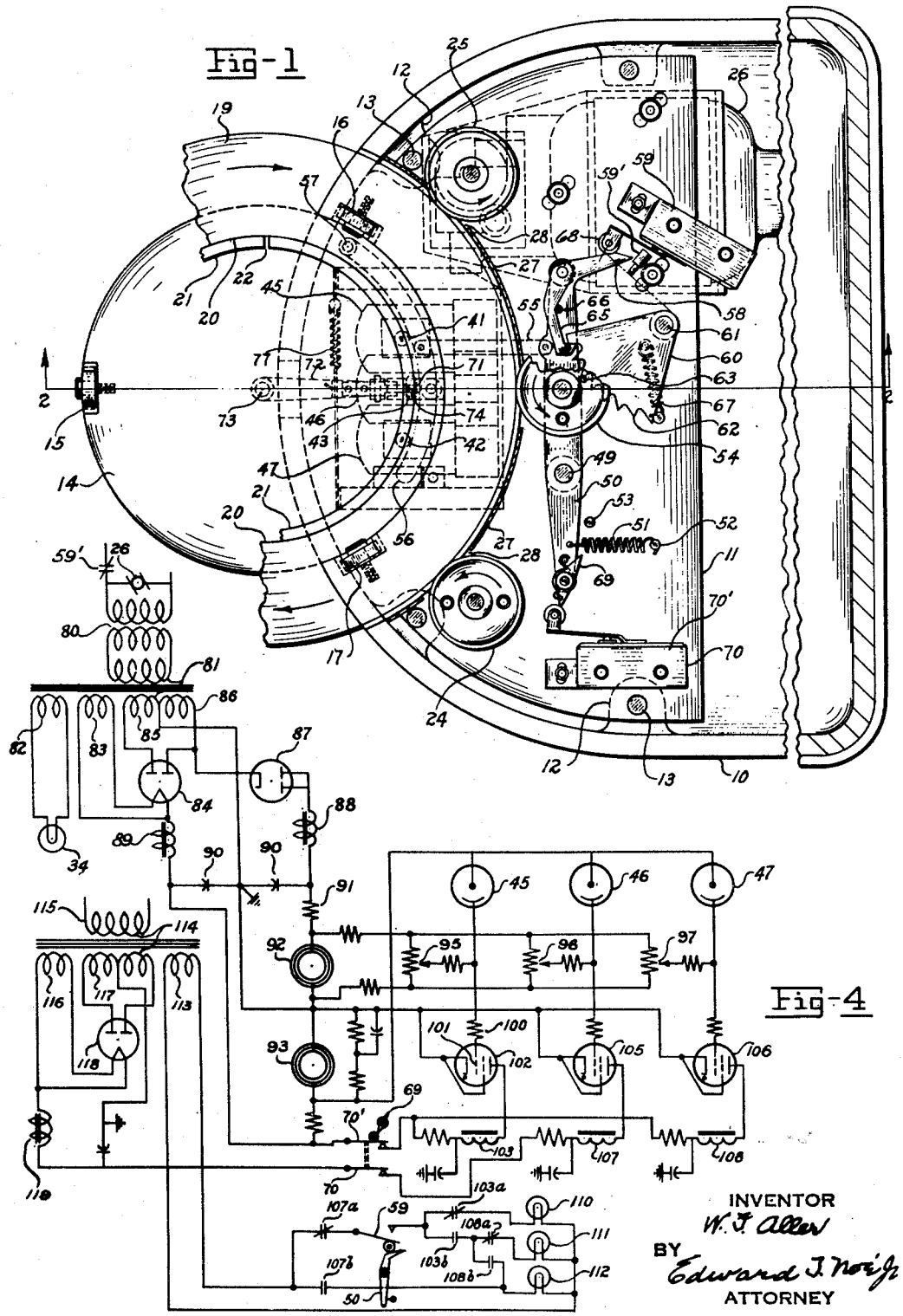
INVENTOR
W. F. Aller
BY
Edward J. Noiżh
ATTORNEY Nov. 8, 1949     W. F. ALLER     2,487,628
GAUGING DEVICE FOR PISTON RINGS AND THE LIKE
Filed Nov. 10, 1944     2 Sheets-Sheet 2
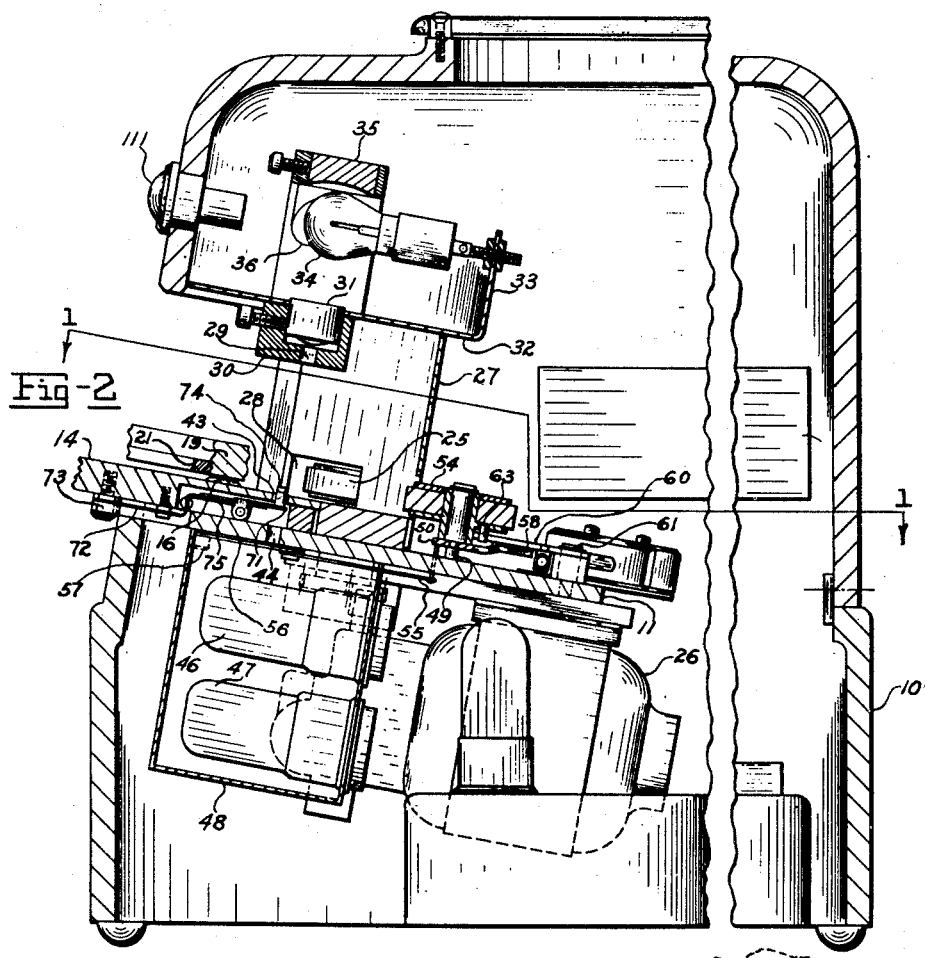
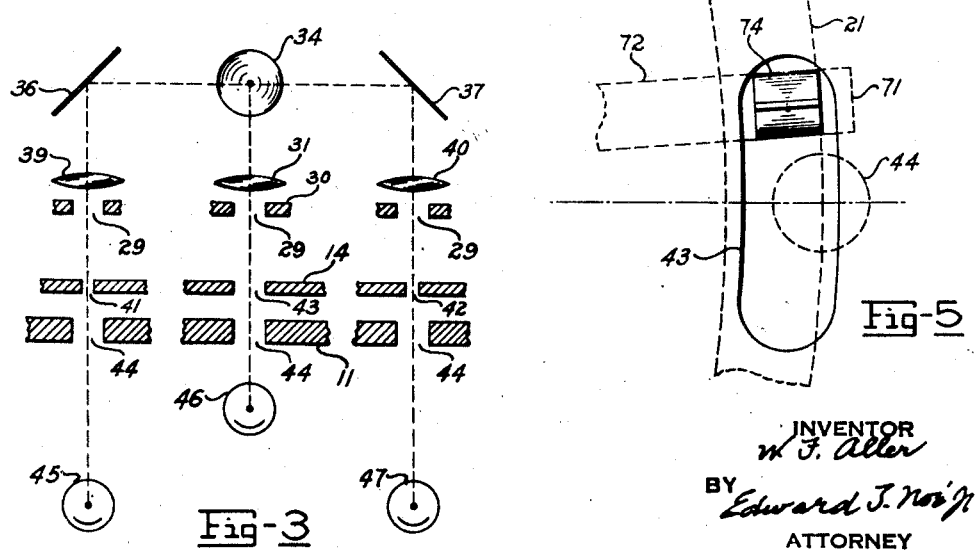
INVENTOR
W. F. Aller
BY Edward J. Noi'ji
ATTORNEY Patented Nov. 8, 1949

2,487,628

UNITED STATES PATENT OFFICE 2,487,628

GAUGING DEVICE FOR PISTON RINGS AND THE LIKE

Willis Fay Aller, Dayton, Ohio, assignor to The Sheffield Corporation, Dayton, Ohio, a corporation of Ohio Application November 10, 1944, Serial No. 562,780

14 Claims. (Cl. 88—14)

This invention relates to gauging devices, and more particularly to gauging devices for checking the contour or size of an object to determine whether or not the object conforms to predetermined standards.

One object of the invention is a provision of a gauge for checking the contour of a workpiece, and including a holder which carries the workpiece and which is movable in a predetermined path while the piece is scanned, to determine the clearance between the object and the holder, the construction being such that the holder can be very conveniently and quickly removed from the other parts of the apparatus, carrying the workpiece with it.

Another object is a provision of a gauge which automatically determines whether or not a clearance gap in an object is oversize or undersize or satisfies a predetermined tolerance limit.

Another object is a provision of a gauge in which a ring or the like is automatically rotated and the clearance between the ring and the holder is automatically inspected, together with indicating means which show whether or not the spacing between the ring and the holder satisfies a predetermined standard.

A further object is a provision of a gauging device for automatically inspecting piston rings to determine whether any deficiencies are present in the outer ring contour and whether or not the gap of the ring is of the proper size.

Other objects and advantages of the invention will be apparent from the following specification, the accompanying claims and the drawings, in which, Fig. 1 is a top plan view of a gauge embodying the present invention, the upper portion of the gauge housing being removed;

Fig. 2 is a vertical section on the line 2—2 of Fig. 1;

Fig. 3 is a diagrammatic showing of the optical system;

Fig. 4 is a wiring diagram showing the electric connections for the various parts, and Fig. 5 is a detail view of the light blocking shutter controlled by the piston ring gap.

Referring more particularly to the drawing, in which the same parts are designated by the same reference numerals in the several views, 10 indicates a housing in which the operating parts of the mechanism are contained. This housing carries a supporting plate 11 which rests on lugs 12 projecting inwardly from the side walls of the housing as shown in Fig. 1, suitable attaching screws 13 fastening the plate 11 in position.

Fixed on the plate is a table 14 which projects out beyond the housing as shown in Fig. 2 and which is preferably arranged at an incline. The table carries a rotatable roller 15 the top of which projects up slightly above the upper surface of the table. Similar rollers 16 and 17 are rotatably supported in the plate 11. The axes of these rollers are arranged radially of the table 14 so that the rollers rotatably support a work holder 19 which, as shown, is in the form of a hollow cylinder or ring. Where this ring is provided for carrying piston rings, as in the particular form of the invention illustrated, the hole in the ring provides a surface 20 which is exactly of the same diameter as the engine cylinder in which the piston ring is intended to operate. The rollers 15, 16 and 17 carry the work holder for rotation about its own axis at a level slightly above the level of the table 14.

The piston ring shown at 21 is applied to the work holder when the latter rests on a smooth flat surface, and is pressed down in the holder until the bottom surface of the piston ring coincides with the plane of the bottom of the work holder. Since the work holder size corresponds to the cylinder diameter, there will normally be a small gap 22 between the ends of the piston rings. The width of this gap is inspected in accordance with the present invention. The gauge is also so arranged as to inspect the clearance, if there is any, between the periphery of the piston ring and the work holder. If the ring properly fits the cylinder there should not be enough clearance for any considerable amount of light to pass between the piston ring periphery and the work holder but if at any point the curvature of the piston ring does not conform to the curvature of the work holder light can pass between these parts and the gauging device is so arranged that if this occurs it will be shown to the operator by a suitable indicating means.

The piston ring is arranged in the work holder as previously mentioned, and the work holder with the ring in it is then merely placed on the table 14, the inclination of the table assuring that the work holder will be carried in a predetermined position. This position is determined by a locating idler roller 24 rotatably supported on the plate 11, and a second roller 25 carried by the plate opposite the first roller. The roller 25 is positively operated by an electric motor 26 and the frictional engagement between the outside of the work holder 19 and the surface of the roller 25 causes the work holder to be rotated about its own axis during the inspection of the part.

The plate 11 carries an arcuate wall 27 which forms a partition in back of the space over the table 14. This wall 27 has openings 28 through which the rollers 24 and 25 project for contact with the work holder, as will be apparent from Figs. 1 and 2. Supported by the upper end of the partition wall 27 is a light source which produces three beams of light arranged concentrically about the axis of rotation of the work holder and directed downwardly towards the work though openings 29 in a carrier 30 which supports a lens 31. The carrier 30 is supported by a plate 32 which has an upstanding portion 33. An electric lamp 34 is carried by this upstanding portion below a reflector 35. At both sides of the lamp 34 are mirrors or reflectors 36 and 37 which reflect light from the lamp 34 down through lenses 39 and 40 respectively towards apertures 41 and 42 in the table 14, these apertures being slots a few sixty-fourths of an inch wide and having a length at least as great as the gap of the piston ring. The two apertures 41 and 42 are circumferentially spaced from an aperture slot 43 in the table 14, through which the light that passes downwardly from lamp 34 can travel. Holes 44 are provided in the plate 11 below these three light apertures in the table. Below the three holes 44 are three light responsive photoelectric tubes 45, 46 and 47, the tube 45 being in line with the aperture 41 and tubes 46 and 47 being respectively in line with the apertures 43 and 42. These tubes are supported by a box 48 depending from the plate 11.

The two apertures 41 and 42 are located slightly inside of the inner surface of the holder 19 with their long dimensions tangential of the piston ring and check the width of the gap of the piston ring as the latter is rotated. The tube 45 below aperture 41 determines whether or not the gap is too small, while the aperture 42 and the tube 47 determine whether or not the gap is too large. The light that passes through the aperture 43 is centered on a line corresponding to the inner surface of the work holder and this corresponds to the outer surface of the work itself if the work is in proper contact and conforms to the curvature of the work holder. The tube 46 provides a continuous inspection of the clearance between the outer surface of the piston ring and the work holder. If at any time during the rotation of the piston ring, light in excess of a predetermined amount is passed through the work and the holder to the tube 46, the latter produces an indication showing that the contour of the piston ring does not properly satisfy requirements.

The plate 11 has a stud 49 on which a lever 50 is pivotally supported. A spring 51 attached to this lever and to a pin 52 on the plate 11 yieldingly urges the lever in a counterclockwise direction, and tends to hold the lever against a stop pin 53. The lever forms a pivotal support for a roller 54, and the spring 51 normally holds this roller some distance to the left from that shown in Fig. 1, when the work holder is not in position. However, as soon as the work holder is applied and rests against the drive roller 25 and the idler roller 24 it presses against and pushes back on the roller 54, swinging the arm 50 into the operative position shown. A link 55 is pivotally connected at one end to the lever 50 and at its other end to a shutter plate 56 pivotally supported at 57 just below the plate 11 and normally, when the work holder is not in position, being interposed directly below the three apertures 41, 42 and 43 and thus blocking the light rays from the photoelectric tubes. As soon as the holder is placed in position and swings the lever 50 to the position shown, this shutter is automatically retracted and the passage of light from the light sources to the tubes is then affected only by the piston ring gap and the clearance between the periphery of the work and the holder.

The upper end of the lever 50 is provided with a tail 58 which normally holds a switch 59 closed until the work holder is applied. In the position shown in Fig. 1 the tail 58 has been moved clockwise far enough to open this switch. This switch is also controlled by a segmental ratchet plate 60 which can be moved far enough clockwise from its normal position shown to come up against the switch operating roller and close the switch 59. At the same time it comes up against a normally closed microswitch 59' which may be provided in the motor circuit and stops the motor at the end of a cycle of operations. The ratchet plate 60, which is pivotally supported at 61 on the plate 11, is provided with teeth 62. The roller 54 has a downwardly projecting pin 63 and each time the roller makes one revolution this pin engages a successive tooth of the plate 60 and turns the plate one tooth space, so that in several steps it advances the plate 60 and after a little more than one revolution of the work is completed it brings the plate 60 against the operating roller 68 of the switch 59 and closes this switch. A spring pressed holding pawl 65 is pivotally supported on the end of the lever 50 and holds the plate 60 against return movement as long as the lever 50 is in its normal operating position. When the work is removed and the lever swings counterclockwise, a pin 66 on the lever positively retracts the holding finger of this pawl from the ratchet plate and the latter is then returned by a spring 67.

On the lower end of the lever 50 is a spring pressed pivoted finger 69 which holds a double switch 70, 70' closed when the lever 50 is pushed back by the work holder, although when the work holder is removed the movement of the finger 69 towards the right as viewed in Fig. 1 permit these switches to open.

The beam of light that passes through the aperture slot 43 is the one which continuously scans the clearance space between the piston ring and the holder as these are rotated, and to block light from passage through the gap at the ends of the piston ring, when the gap passes by this slot, there is an automatic shutter 71 which travels across the slot and temporarily cuts off the passage of light to the tube 46 as the piston ring gap passes by. This shutter 71 is provided on the end of a pivot arm 72 arranged for swinging movement on the lower side of the table 14 on a pivot pin 73. Adjacent the shutter 71, the arm carries a wedge-shaped finger 74 which projects up far enough to enter the gap of the piston ring although normally the lower side of the piston ring holds this finger depressed until the gap comes around to it. That portion of the arm 72 which carries the finger 74 is a spring blade 75 normally acting to raise the finger, but permitting the piston ring to hold the finger depressed until the slot or gap comes opposite the finger. At that time the finger will rise into the slot and it will then travel along with the slot, the arm 72 pivoting on the pivot stud 73, carrying the shutter 71 along so as to block the light passage. As soon as the slot of the piston ring has passed the slot 43 in the table, the inclined or wedge-shaped upper end of the finger is carried down during continued movement of the piston ring, and a spring 77 pulls the arm 72 back to its normal position with the shutter 71 retracted.

The electrical connections to the various parts are diagrammatically shown in Fig. 4. The motor 26 is supplied from a suitable power source such as a 110 volt alternating current source which also supplies a constant voltage transformer 80 the output voltage of which is automatically maintained constant. The output side of this transformer is connected to the primary winding of a transformer 81 having secondary windings including a winding 82 which is connected to the electric lamp 34. Another secondary winding 83 supplies the filament element of a rectifier tube 84 having plates connected to the additional secondary windings 85 and 86. These windings are also connected through rectifier tube 87, choke coils 88 and 89, condensers 90 and a resistance 91 to voltage regulating tubes 92 and 93. The tube 92 controls the voltage through individual potentiometers 95, 96 and 97 respectively supplied to the grids of three control tubes 102, 105 and 106. The amount of light that can energize the selenium photoelectric tubes is controlled by adjustment of the potentiometer connections of the control tubes 102, 105 and 106. Tube 93 controls the anode voltage of the three photoelectric tubes 45, 46 and 47.

The photoelectric tube 45 has its cathode connected through a resistance 100 to the control grid 101 of a four-element gas filled control tube such as a Thyratron 102 which produces a current flow in its anode or plate circuit as soon as a certain control voltage is applied and maintains the current flow until the plate circuit is interrupted. The plate of this tube is connected to a relay coil 103 which controls a switch 103a which is normally closed and a switch 103b which is normally open until the photoelectric tube 45 receives enough light to energize the control grid 101 to the extent required for current flow through the relay winding 103.

The photoelectric tubes 46 and 47 are similarly connected to Thyratron tubes 105 and 106 which are connected respectively to the relay coils 107 and 108. The coil 107 controls a swich 107a which is normally closed and a switch 107b which is normally open. The relay coil 108 controls a switch 108a which is normally closed and a switch 108b which is normally open.

The several switches just referred to are connected in a circuit including indicator lamps 110, 111 and 112, the lamp 111 being shown in Fig. 2 on the upper portion of the housing while lamps 110 and 112 are arranged at opposite sides of this lamp. The lamp 111 is preferably of a green color, which, when energized, indicates proper tolerance. The lamp 112 may be a red lamp, as it shows oversize gap or an excessive clearance between the periphery of the piston ring and the piston ring holder. The lamp 110 may be a yellow lamp showing an undersize condition of the gap. These several lamps and switches are connected, as shown, to the secondary winding 113 of a voltage transformer 114 having a primary winding 115 connected across the 110 volt supply source. The winding 113 is also connected to the several heating elements to the several control tubes. There are additional secondary windings 116 and 117 connected to a rectifier tube 118 and to a choke coil 119 connected to the output element of control tube 105 through the automatically operable switch 70 which is closed by the lever 50 when the workpiece is applied and opened as soon as the workpiece is removed, the automatic opening of this switch being effective to return the Thyratron control tube 105 to its normal deenergized condition. The switch 70' which is also automatically operable with switch 70 is connected to the output elements of control tubes 102 and 106 to return them to their normal deenergized condition at the end of the gauging operation when the work is removed.

When the workpiece with its holder is applied, the motor 26 having previously been energized, the switches 70, 70' are closed and the switch 59 is opened, these operations taking place automatically by movement of the lever 50. The work holder is rotated, and during its rotation the shutter 56 is of course retracted, and the automatic shutter 71 on the end of the arm 72 is held back by the spring 77, permitting light to pass from the lamp 34 down between the outer wall of the piston ring and the inner wall of the work holder if there is a sufficient gap present to permit light passage.

If light in excess of a predetermined permissible amount cannot pass due to the closeness of the fit of the ring in the holder, the photoelectric tube 46 will not be energized sufficiently to energize or fire the tube 105 and consequently the relay 107 will not be energized and the switches 107a and 107b will remain in their normally closed and normally opened conditions respectively. As the switch 107a is in series with switch 59, the green lamp 111 will not be energized at this time, and there will be no circuit completed through the red lamp 112. However, if there is a sufficient passage of light to energize the photoelectric tube 46 and current flow takes place from the anode of the control tube 105, the relay coil 107 will be energized and this condition will continue due to the tube characteristic. Energization of this coil 107 opens switch 107a and closes switch 107b. As soon as switch 107b closes it will complete a circuit through the red lamp 112 and thus immediately show the operator an out of tolerance condition in the clearance or fit between the piston ring and the holder.

When the piston ring gap comes opposite the light emitted through the aperture 41 on the tube 45, if the gap is undersize, there will be an insufficient energization of the tube 45 to fire or energize the tube 102, but if the gap is normal or oversize enough light is supplied to the tube 45 for energization of the control tube 102 and the current flow through the relay coil 103 will open the switch 103a and close the switch 103b.

When the gap in the piston ring comes opposite the aperture 42 and there is a passage of light beams to the tube 47, if the gap is undersize or of the predetermined proper range of size the control tube 106 will not be energized and there will be no flow through the coil 108, switches 108a and 108b remaining in their normal positions. If the gap is oversize there is sufficient light passage to the tube 47 for current to flow through the coil 108, and the switches 108a and 108b will be affected. If the peripheral shape of the piston ring is proper so the switch 107a remains closed, and the gap width is neither oversize nor undersize as regards a normal permissible range, the switch 103b will be closed and switch 108a will remain closed so that the green light 111 will be energized to show a satisfactory condition at the end of full revolution of the work, for at the completion of a revolution the switch 59 is automatically closed by the ratchet plate 60. The green light will therefore only come on at the end of the gauging test, and this is also true of energization of the yellow lamp 110, for that too is in series with the switch 59. If the clearance or spacing between the piston ring and the holder is excessive, the red lamp 112 will be energized through switch 107b as soon as that part of the workpiece having this out of tolerance condition comes under the beam through the orifice 43. The red lamp 112 will also be energized at the completion of a full revolution of the work if the distance across the gap of the ring is excessive, for then the normally open switch 108b will be closed and a circuit completed through closed switches 103b, 59 and switch 107a which remained closed because the peripheral shape was satisfactory. Since the green light 111 will not be energized until a full cycle of operations is completed, the operator knows if he sees the green light appear, that a complete check has been made and that both the gap size and contour or curvature of the ring are such as to satisfy the required conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a gauge for checking the contour of a workpiece, a holder having a central object-receiving opening adapted for interfitting association with and for frictionally supporting the work-piece and having a surface contour complementary to the desired workpiece contour, a support for said holder, means for rotatably operating said holder about an axis to continuously move the contour surface of the holder past an inspection zone, an optical inspection means at the inspection zone for passing a light beam parallel to the rotational axis of the holder between the workpiece and the holder and including a light sensitive element responsive to the amount of light passing to show an abnormal dissimilarity of the workpiece and the holder contours, said holder being removable with the workpiece from said support without requiring adjustment of any of the parts of the apparatus and merely by applying an upward force on said holder, and means automatically operable as an incident to the removal of the holder for blocking the passage of light to said light sensitive element, said automatically operable means comprising a shutter carried for movement into and out of the path of the light beam and normally arranged in the path of the light beam and an arm for retracting said shutter and controlled by said holder to retract the shutter when the holder is in position on the support.

2. A gauge for checking the contour of an annular interrupted workpiece comprising a workpiece holder having a surface contour complimentary to the desired workpiece contour, means for rotating said holder to move the contour surface of the holder past an inspection zone, means at the inspection zone for passing a light beam between the workpiece and the holder, a light sensitive element responsive to the amount of light passed, indicating means operated by said light sensitive element, a shutter for temporarily blocking passage of light to said light sensitive element, and means for automatically operating said shutter when the interruption in the workpiece passes the inspection zone.

3. A gauge for checking a workpiece comprising a workpiece holder adapted to interfit a workpiece, a support having an inclined table provided with means carrying the under side of the workpiece holder for rotational movements, an idler wheel on said support for engaging and locating a peripheral portion of said workpiece holder, a power operated roller for engaging and driving the workpiece holder, the inclination of said table being such as to maintain the workpiece holder against said rollers in a predetermined location, and means for continuously inspecting the clearance between the workpiece holder and the workpiece as they are rotated past an inspection zone.

4. A gauge for automatically checking the size of the gap opening of a piston ring or the like comprising means for moving the piston ring to carry said opening successively past a plurality of annularly spaced inspection zones, means at each of said inspection zones for passing a light beam through said opening, a light responsive element at each inspection zone, indicators for respectively showing undersize gap, oversize gap or a gap of a predetermined normal size range, and means controlled by said light responsive elements for energizing a selected one of said indicators in accordance with whether or not said opening is within the predetermined normal size range or is oversize or undersize.

5. A gauge for automatically checking the size of the gap opening in a workpiece such as a piston ring or the like comprising means for moving the workpiece to carry said opening successively past a plurality of annularly spaced inspection zones, means at each of said inspection zones for passing a light beam through said opening, a light responsive element at each inspection zone, a normally closed switch controlled by the light beam passing through the gap opening to one of said light responsive elements if the light exceeds a predetermined amount, a normally open switch controlled by the light beam passing through the gap opening to the other light responsive element if the light beam exceeds another predetermined amount, and an indicator means in series with both of said switches for showing if the gap opening is either greater or less than a predetermined tolerance condition.

6. A gauge for automatically checking the size of an opening in a workpiece comprising means for rotating the workpiece to carry said opening successively past a plurality of spaced inspection zones, means at each of said inspection zones for passing a light beam through said opening, a light responsive element at each inspection zone, indicators, means controlled by said light responsive elements for energizing said indicators in accordance with whether or not said opening is oversize or undersize, and means automatically operable at the completion of a full revolution of the workpiece for indicating a normal size.

7. A gauge for checking the contour of a piston ring or similar split workpiece and the size of the gap or opening in the workpiece comprising a workpiece holder having a circular internal surface contoured complimentary to the desired workpiece contour, means for operating the holder to move the contour surface of the holder past a contour inspection zone and a pair of gap or opening inspection zones annularly spaced apart, means at the contour inspection zone for passing a light beam between the workpiece and the holder, means at each opening inspection zone for passing a light beam through the opening in the workpiece, means responsive to the amount of light passing the contour inspection zone to indicate an out of tolerance condition of the contour, means responsive to the amount of light passing one of the gap or opening inspection zone to indicate a gap that is too small and means responsive to the amount of light passing the other gap or opening inspection zone to indicate that the gap opening is too large for showing in or out of tolerance condition of the contour and the opening size.

8. A gauge for checking the contour of a split ring comprising a holder adapted for telescopic engagement with the workpiece, means for rotating the holder to operate the ring along a series of annularly spaced inspection zones, means for passing a light beam between the workpiece and holder at one of said zones as the ring is rotated, indicating means responsive to the amount of light passing for indicating normal or abnormal ring contour, means for passing a light beam between the ends of the ring at another inspection zone, and means controlled by said last light beam for controlling said indicating means.

9. A gauge for checking the contour and gap size of a piston ring comprising a support for rotatably supporting a workpiece holder, a workpiece holder in said support adapted for interfitting with said workpiece, means for rotating said holder to move the contour of the workpiece along inspection zones, inspection means adjacent at least one of such inspection zones for gauging the size of the gap in the workpiece, a light source at a contour inspection zone for passing a light beam between the workpiece and the holder, means responsive to the amount of light passing between the workpiece and the holdre during the rotation of the holder for showing an abnormal contour, and means for automatically blocking the light from said light source to said responsive means when the gap in the workpiece passes said contour inspection zone.

10. A gauge for automatically checking the contour and the gap size of a workpiece comprising means for moving the workpiece to carry said gap past a plurality of annularly spaced gap inspection zones and carry a contour surface of the workpiece past a contour inspection zone, means at each of said gap inspection zones for passing a light beam through said gap, a light responsive element at each gap inspection zone, indicators for respectively showing undersize gap, oversize gap and a gap within a normal predetermined size range, means controlled by the light responsive elements at the gap inspection zones for controlling the energization of said indicators in accordance with whether or not the gap size is normal, oversize or undersize, and means controlled by the light responsive element at the contour inspection zone for controlling the energization of said indicators in accordance with whether or not the contour of the workpiece is normal or abnormal.

11. An apparatus for inspecting a circular object such as a piston ring, comprising a support, means for projecting a beam of light, a gauge rotatable about an inclined axis parallel to the axis of said beam, said gauge having a central object receiving opening of predetermined diameter and shape and adapted to receive the object to be inspected with its outer wall engaging the wall of the opening and frictionally supported therein, so that light may pass therebetween wherever the walls are not in contact, the beam projecting means and the contacting walls of the opening and the object being aligned with each other, a light sensitive device positioned on said support to receive light passing between said walls of the opening and the object, a series of rotatable elements rotatably mounted on said support and bearing against the lower side of said gauge, and the series of rotatable elements bearing against peripheral portions of said gauge at only one side of the axis thereof and locating the axis of rotation of the gauge and so arranged that gravity is the sole restraint holding the gauge against upward movement from the first series of rotatable elements and against upward and outward movement from the second series of rotatable elements whereby the gauge may be readily separated from the support without requiring adjustment of any of the parts of the apparatus, and indicating means controlled by said light sensitive device.

12. An apparatus for inspecting a circular object such as a piston ring, comprising a support, means for projecting a beam of light in a downward direction, a gauge rotatable about an axis parallel to the axis of said beam, said gauge having a central object receiving opening of predetermined diameter and shape and adapted to receive the object with its outer wall engaging the wall of the opening and frictionally supported therein, so that light may pass downwardly therebetween wherever the walls are not in contact, the beam-projecting means and the contacting walls of the opening and the object being aligned with each other, a light sensitive device positioned on said support below said gauge to receive light passing between said walls of the opening and the object, a series of rotatable elements rotatably mounted on said support and bearing against the lower side and against peripheral portions of said gauge and locating the axis of rotation of the gauge at an arcuate angle to the vertical and so arranged that gravity is the sole restraint holding the gauge against upward movement whereby the gauge may be readily separated from the support without requiring adjustment of any of the parts of the apparatus, a power operated roller yieldingly mounted on said support for movement towards and from the gauge axis for driving the gauge when positioned on said rotatable elements and indicating means controlled by said light sensitive device.

13. An apparatus for inspecting a circular object such as a piston ring, comprising a support, means for projecting a beam of light, a circular gauge mounted for rotation on said support about an axis parallel with the axis of said beam, a drive roller in peripheral engagement with said gauge, a power means for turning said roller to rotate the gauge, a driven roller operated by said gauge, timing means controlled by said driven roller for automatically indicating the completion of a full rotation of the gauge after its insertion on the support, said gauge being held on the support so that an upward pull on the gauge instantly removes the same together with the object to be inspected, means automatically operable upon removal of the gauge from the support to reset said timing means, said gauge having a central object-receiving opening of predetermined diameter and shape and adapted to receive the object to be inspected with its outer wall engaging the wall of the opening so that light may pass therebetween at an inspection zone wherever the walls are not in contact, the beam projecting means and the contacting walls of the opening and the object being aligned with each other and a light sensitive device positioned to receive light passing between said walls of the opening and the object, and indicating means controlled by said light sensitive device.

14. An apparatus for inspecting an interrupted circular object such as a piston ring comprising a support, means for projecting a beam of light, a gauge mounted for rotation on said support about an axis parallel with the axis of said beam, said gauge having a central object-receiving opening of predetermined diameter and shape and adapted to receive the object to be inspected with its outer wall engaging the wall of the opening so that light may pass therebetween at an inspection zone wherever the walls are not in contact, the beam projecting means and the contacting walls of the opening and the object being aligned with each other and a light sensitive device positioned to receive light passing between said walls of the opening and the object, a shutter operably mounted on said support and movable into the path of the light beam passing from the beam projecting means to the light sensitive device for temporarily blocking the passage of light to said light sensitive device, means for automatically operating said shutter when the gap in said object passes the inspection zone, indicating means controlled by said light sensitive device.

WILLIS FAY ALLER.

REFERENCES CITED

The following references are of record in the file of this patent:

UNITED STATES PATENTS

| Number | Name | Date |
|---|---|---|
| 1,332,571 | Ray | Mar. 2, 1920 |
| 1,455,864 | Busick | May 22, 1923 |
| 1,618,965 | Hermann | Feb. 22, 1927 |
| 1,816,532 | Holloway | July 28, 1931 |
| 1,963,128 | Geister | June 19, 1934 |
| 2,027,595 | Knobel | Jan. 14, 1936 |
| 2,047,408 | Emery et al. | July 14, 1936 |
| 2,177,133 | Desch | Oct. 24, 1939 |
| 2,254,812 | Aller | Sept. 2, 1941 |
| 2,433,588 | Hurley | Dec. 20, 1947 |
| 2,441,343 | Becker | May 11, 1948 |